United States Patent [19]
Falkenstein et al.

[11] 4,156,064
[45] May 22, 1979

[54] PROCESS FOR THE MANUFACTURE OF POLYURETHANE ADHESIVES

[75] Inventors: Georg Falkenstein, Neustadt; Otto Volkert, Weisenheim, Berg; Lothar Mämpel, Bruhl, all of Fed. Rep. of Germany

[73] Assignee: BASF Wyandotte Corporation, Wyandotte, Mich.

[21] Appl. No.: 723,798

[22] Filed: Sep. 16, 1976

[30] Foreign Application Priority Data

Sep. 17, 1979 [DE] Fed. Rep. of Germany ....... 2541339

[51] Int. Cl.$^2$ ...................... C08G 18/82; C08G 18/08; C08G 18/32
[52] U.S. Cl. ....................................... 528/46; 106/195; 106/196; 156/314; 156/315; 156/322; 156/331; 260/24; 260/37 N; 260/858; 260/859 R; 528/480; 528/492; 528/495; 528/905
[58] Field of Search ............. 260/77.5 AA, 77.5 MA, 260/77.5 AM, 75 NE, 75 NA, 77.5 A; 528/46, 480, 492, 495, 905

[56] References Cited

U.S. PATENT DOCUMENTS

| | | | |
|---|---|---|---|
| 2,871,227 | 1/1959 | Walter | 260/2.5 AP |
| 3,310,533 | 3/1967 | McElroy | 260/77.5 AA |
| 3,321,433 | 5/1967 | Baumann | 260/77.5 A |
| 3,326,861 | 6/1967 | Sandridge | 260/75 |
| 3,933,756 | 1/1976 | Wagner | 260/75 NE |
| 4,046,741 | 9/1977 | Scher | 260/77.5 A |

*Primary Examiner*—H. S. Cockeram
*Attorney, Agent, or Firm*—Robert J. Henry; Bernhard R. Swick; Robert E. Dunn

[57] ABSTRACT

Process for the manufacture of polyurethane adhesives with uniform molecular weights which are accurately adjustable and reproducible consisting of diisocyanates, polyols, chain extenders if required, catalysts and additives, all of which are soluble in polar, organic solvents which are inert with respect to isocyanate groups. The polyaddition process is carried out by using an excess of diisocyanate, the reaction is terminated upon reaching the desired molecular weight, and the still existing excess isocyanate groups are allowed to react with alcohols, ammonia and/or amines. The process is characterized in that the polyurethanepolyaddition products are crushed into particles of 1-15 mm and that they are treated with possibly substituted primary, aliphatic mono- to trivalent alcohols, ammonia and/or aliphatic, cycloaliphatic or aromatic mono- or diamines in the liquid or vapor phase in the absence of organic solvents.

10 Claims, No Drawings

PROCESS FOR THE MANUFACTURE OF POLYURETHANE ADHESIVES

BACKGROUND OF THE INVENTION

1. Field of the Invention

The invention concerns a process for the manufacture of polyurethane adhesives which are soluble in polar, inert organic solvents, and the molecular weight of which is accurately adjustable and reproducible.

2. Description of the Prior Art

The use of long-chain, primarily linear polyurethanes, possibly in combination with certain cross-linking agents, as adhesives is a familiar fact. The polyurethanes are generally supplied in granulate form and are used as adhesives after being dissolved in certain solvents, such as methyl-ethyl-ketone or ethyl acetate. For reasons of adhesion technology the solutions with a given solids content must have as accurately reproducible a solvent viscosity (also: solution viscosity) as possible, i.e., the polyurethanes must have as accurately reproducible a molecular weight as possible.

The manufacture of polyurethanes in solution by conversion of organic polyisocyanates with organic compounds, which contain reactive hydrogen atoms capable of reacting with the isocyanate groups, has been part of the state of the art for a long time. Such polyurethanes are used for a multitude of applications. However, it is very difficult to produce reproducible products with uniform physical properties with sufficient accuracy, particularly on an industrial scale, when the basic compounds for the polyurethane synthesis are reacted in approximately equivalent quantities, i.e., with an NCO/OH ratio of between approximately 0.95:1 and 1.10:1. The reason for the insufficient reproducibility of the properties of polyurethanes lies in a number of possible secondary reactions which depend upon a number of difficult to control parameters.

The most important of these parameters is the NCO/OH ratio itself. Under operating conditions this parameter can be maintained constant only within a range of ±1%. In order to obtain accurately defined and reproducible molecular weights in accordance with prior known techniques, a weighing accuracy for polyol and polyisocyanate in the range of 0.1% is essential. Even a slight variation in the NCO/OH ratio results in great changes in the rheologic properties, such as molecular weight, melting index, solution viscosity, content of highly cross-linked particles and therefore, finally, the quality of the adhesive.

The variations in the NCO/OH ratio can be caused by weighing or metering errors and also by insufficient purity of the reactive materials and the solvents, e.g., by water, or by slight variations in the molecular weight of the polyols.

In order to manufacture products of uniform and reproducible quality, it is therefore necessary to control the polyaddition process in such a manner that—upon reaching the desired degree of polymerization and/or the desired viscosity of the polyurethane solution—the polyaddition can be completed without interfering secondary reactions.

It is a known fact that the polyaddition process can be terminated by adding monofunctional H-acid compounds, such as primary and secondary alcohols or amines.

According to a process described in the German Patent Publication, DT-OS No. 1 595 784, a primary alcohol is added to a polyurethane solution in dimethylformamide in order to terminate the polyaddition reaction. An excess of alcohol must be used in order to obtain a quick breaking of the chain with alcohols. In the case of many polyurethane solutions, particularly in the case of polyester-urethane solutions this results in the decomposition of chains.

According to DT-OS No. 1 906 555 a quick chain breaking reaction by addition of a monoamine is possible, but it is very difficult to add exactly the required amount of monoamine. An excess of monoamine causes a decomposition of the chain, whereas too little monoamine causes continued chain expansion of the polyurethane.

In DT-OS No. 2 323 393 it is suggested that secondary alcohols be added to the reaction mixture in order to selectively suppress the formation of allophanate. This results in a reduced dispersion range of the viscosity of PUR solutions in case of variations of the NCO/OH ratio up to approximately 4%, and these variations are still too large for many areas of application.

In U.S. Pat. No. 3,310,533 it is suggested that the polymerization reaction be terminated by pouring out and rapidly cooling the reaction mixture. This process also is not suited for the production of polyurethanes with defined molecular weights, since the polyaddition products still contain reactive NCO-groups which react during storage, thereby enlarging the existing molecules.

According to DT-AS No. 1 694 127 monofunctional compounds in subordinate quantities (relative to the NCO content) can also be used in order to reduce the molecular weight and/or in order to still obtain soluble polyurethanes in spite of a certain branching of molecules. These monofunctional compounds include, e.g., butylamine, butyl semicarbazide or N,N'-dimethylhydrazine. This procedure necessarily results in great variations in the end viscosities of the PUR solutions. If the molecular weight of the polyurethane and/or the polyurea-urethane is too low, DT-AS 1 157 386 suggests adjusting the desired solution viscosity by means of carefully adding additional—preferably less reactive aliphatic di- or triisocyanates. After reaching the desired viscosity the product can be stabilized by converting the end groups of the polyurethane with monoisocyanates such as butylisocyanate, anhydrides, or other acylating substances such as acid chlorides. In addition to the laborious mode of operation, this process has the drawback of having the viscosity adjustment take place very slowly and the termination reaction with the end groups not take place instantaneously, therefore not resulting in an accurately controlled viscosity.

SUMMARY OF THE INVENTION

The purpose of this invention is to provide a process which eliminates the drawbacks of the processes referred to above and which makes possible the production of polyurethane adhesives with uniform molecular weights and reproducible mechanical properties in the absence of traditional, polyurethane dissolving organic solvents.

It has been found that polyurethanes with accurately defined molecular weight are—surprisingly—obtained if the polyol and the diisocyanate are not converted at the calculated weight ratio, and tempering the polyurethane until all NCO groups have disappeared; but, instead, if an excess of diisocyanate is used and the tempering process is terminated at the desired solution viscosity. The chronological increase in the solution viscosity, or, in other words, the chronological increase of the molecular weight of the polyurethane within certain limits is surprisingly essentially independent of the NCO/OH ratio. At the normally applied temperatures of 120°–125° C. this process takes place so slowly that it can be followed conveniently by following the melting viscosity and be interrupted at the appropriate point in time. In order to avoid further reaction of the NCO and OH groups still existing at this point in time, the polyurethane is reduced to small particles and is treated with alcohols, ammonia and/or amines in the absence of organic, polyurethane dissolving solvents.

The object of this invention therefore is to provide a process for the manufacture of polyurethane adhesives consisting of diisocyanates, polyols and possibly chain extenders and additives soluble in polar, organic solvents which are inert with respect to isocyanate groups.

According to the process of this invention the polyaddition is carried out by using an excess of diisocyanate, the reaction is terminated upon reaching the desired molecular weight, and the still existing excess isocyanate groups are reacted with alcohols, ammonia and/or amines. The process is characterized by the polyurethane-polyaddition products being changed into particles of 1–15 mm and then being treated with possibly substituted primary, aliphatic mono- to trivalent alcohols, ammonia and/or aliphatic, cycloaliphatic or aromatic mono- or diamines in the liquid or vapor phase in the absence of organic solvents.

In a very simple manner the process according to this invention makes possible the manufacture of stable polyurethane adhesives which are reproducible with respect to their viscosity and/or their molecular weight as well as their mechanical properties. This is accomplished by allowing the NCO groups to react with the alcohol, ammonia and/or the amines thus preventing subsequent cross-linking and increase in the molecular weight of the polyurethanes.

The process according to this invention furthermore offers the great advantage of not only being able to carry out the polyaddition reaction for the manufacture of polyurethane in the molten stage, i.e., without solvent, but also of being able to saturate the NCO groups and thus adjusting the reproducible molecular weight in the absence of organic solvents. The manufacture of polyurethane without solvents results in so great a simplification and cost reduction of the process—particularly in view of environmental protection considerations—that it is preferred in most instances.

DESCRIPTION OF THE PREFERRED EMBODIMENTS

The manufacture of the polyurethane adhesives takes place according to basically familiar methods of polyols with molecular weights above 400, containing at least two bonded hydroxyl groups, of diisocyanates and possibly chain extending agents and additives.

Some polyols containing hydroxyl groups to be mentioned here as examples are polyether polyurethanes containing hydroxyl groups, polyester polyurethane containing hydroxyl groups, polyetherols and/or polyesterols. Difunctional polyols and particularly linear polyesterols are used on a preferential basis.

Suitable polyesterols preferably have two hydroxyl groups and should have a molecular weight of 500 to 5000, preferably 800 to 2500. For the manufacture of the polyesterols straight-chained alkane dicarboxylic acid with 4 to 12, preferably 6 to 12 carbon atoms, as succinic acid, pimelic acid, suberic acid, azelaic acid, sebacic acid, dodecanedioic acid and preferably adipic acid and alkane diol with 2 to 10, preferably 4 to 6 carbon atoms, as ethylene glycol, octanediol, decanediol and preferably butane diol-1,4,-pentane diol-1,5 and hexane diol-1,6 and straight-chained hydroxylalkanemonocarboxylic acids with at least 5 carbon atoms or their lactones should be used.

Hydroxyl polyester of adipic acid and butane diol-1,4 of adipic acid and hexane diol-1,6, and also polyester of $\epsilon$-caprolacton with molecular weights of 300 to 3000 are especially well suited and are therefore used on a preferred basis.

Instead of all or part of the polyesterols, polyether polyols with a molecular weight of approximately 400 to 8000, preferably 1000 to 4000 may be used. Typical polyetherols that come under consideration are those which have been produced by polyalkoxylation of preferably bivalent alcohols such as ethylene glycol, propylene glycol-1,3, butane diol-1,4 and hexane diol with ethylene oxide and/or propylene oxide. Mixtures of various polyalkylene oxides containing hydroxyl groups, e.g., those manufactured from alcohol mixtures by agglomeration of ethylene oxide and/or propylene oxide may also be used.

Additional polyols which are suitable include polyether urethanes and/or polyester urethanes containing hydroxyl groups. Such products are manufactured by conversion of low molecular diols and/or polyesterols and/or polyetherols with molecular weights of approximately 2000 to approximately 10,000 with an excess of diisocyanates according to familiar processes. It has appeared to be expedient to use the hydroxyl compounds and the diisocyanate in such quantities that 1.1 to 2 hydroxyl groups are available in the reaction mixture per NCO group.

The diisocyanates familiar from the polyurethane chemistry are well suited for the process according to this invention. Coming under consideration for this purpose are, e.g., aliphatic, araliphatic and preferably cycloaliphatic and aromatic diisocyanates. To be mentioned in particular are aliphatic diisocyanates such as ethylene diisocyanate, propylene-1,2-diisocyanate, 1,4-butanediisocyanate, 1,8-octamethylenediisocyanate and preferably 1,6-hexanediisocyanate; araliphatic diisocyanates such as 1,3- and 1,4-xylenediisocyanate, cycloaliphatic diisocyanates such as 1,2-, 1,3-, and 1,4-cyclohexylene-diisocyanate, 4,4'-dicyclohexylmethanediisocyanate, hexahydrotoluene-2,4- and -2,6-diisocyanate and mixtures of these two isomers and 1-isocyanato-3,3,4-trimethyl-5-isocyanato-methylcyclohexane and aromatic diisocyanates such as m-phenylene-diisocyanate, 2,4- and 2,6-toluene diisocyanate and their mixtures, 2,2'-, 2,4'- and 4,4'-diphenylmethane-diisocyanate and their mixtures and naphthalene-1,5-diisocyanate. Preferably used are 4,4'-diisocyanato-diphenylmethane and 1-isocyanato-3,3,5-trimethyl-5-isocyanato-methylcyclohexane. Instead of the listed diisocyanates prepolymers containing isocyanate groups of the above referred polyetherols and/or polyesterols and diisocyanates may be used as diisocyanate components.

Possible chain extending agents are aliphatic diamines with 2 to 10, preferably with 2 to 6 carbon atoms and preferably aliphatic diols with 2 to 12, preferably with 4 to 6 carbon atoms. Suitable aliphatic diamines are, e.g., ethylene diamine and preferably 1,4-diaminobutane and 1,6-diaminohexane. As aliphatic diols, the following have proven to work well: ethylene glycol, pentane diol-1,5, octane diol-1,8, decane diol-1,10 and preferably butane diol-1,4 and hexane diol-1,6. Under certain circumstances it may be appropriate to use diols the hydrocarbon chain of which contains oxygen or sulphur atoms bonded as bridging members. Compounds of this type are, e.g., di- and triethylene glycol and thiodiglycol.

When required the diamines and/or diols suitable as chain extenders are used in quantities of 0.1 up to 10% by weight, preferably of 0.5 to 3% by weight, relative to the total of polyol and chain extenders. Possibly catalysts commonly used for the manufacture of polyurethane can also be used. These include organometallic compounds, such as dibutyltindilaurate, tin octoate or iron(II)acetyl acetonate, and tertiary amines, such as triethylenediamine and triethylamine, and mixtures of the listed organometallic compounds and amines.

An important characteristic of the process according to this invention is the fact that an excess of diisocyanate is always used in the manufacture of the polyurethanes.

It was determined to be expedient that the basic materials be used in such quantities that the ratio of the polyol hydrogen atoms and those of any chain extenders reactive with the isocyanate groups to the isocyanate groups be 1:1.001 to 1:1.2, preferably 1:1.05 to 1.1.

As already mentioned the free isocyanate groups bonded in the polyurethane are saturated by conversion with alcohols, ammonia and/or amines after the desired molecular weight has been reached. Well suited for this application are, e.g., primary aliphatic mono- to trivalent alcohols with 1 to 12, preferbly 1 to 6 carbon atoms in the alkyl group (radical). The alcohols may—under certain circumstances be substituted—or may contain bridging links of oxygen, sulphur, —NH— and —NR-groups, wherein R denotes phenyl or an alkyl radical with 1 to 3 carbon atoms. To be mentioned as examples are: monovalent alcohols, such as pentanol, octanol, decanol, dodecanol, cyclohexanol and preferably methanol, ethanol, propanol and hexanol; bivalent alcohols such as hexane diol, decane diol, dipropylene glycol, tripropylene glycol, thiodiglycol, N-methyl-diethanolamine and preferably ethylene glycol, butane diol-1,4 and diethylene glycol, and trivalent alcohols such as glycerin and trimethylol propane. Suitable mono- and/or diamines are the triditionally used, possibly substituted aliphatic, cycloaliphatic and aromatic, primary and secondary amines with 1 to 12, preferably 1 to 6 carbon atoms. To be mentioned as examples are, e.g.: monoamines such as methylamine, ethylamine, propylamine, butylamine, hexylamine, octylamine, dimethylamine, methylethylamine, diethylamine, ethanolamine, monomethyl-ethanolamine, cyclohexylamine, N-monomethylcyclohexylamine and aniline; and diamines such as ethylene diamine, propylene diamine, butylene diamine, hexamethylene diamine and 4,4'-diaminodiphenylmethane. The listed compounds may be used individually as well as in mixtures. Particularly well proven and therefore used on a preferential basis are ammonia, methanol, ethanol, butanol, methylamine and solutions of ammonia, methylamine and ethanolamine in methanol, ethanol, ethylene glycol and diethylene glycol. Suitable and simple to use are alcoholic amine solutions and preferably alcoholic solutions with an amine and/or ammonia content of 0.5 to 10, preferably approximately 1 to 5% by weight relative to the total weight of the solution.

In order to saturate the excess isocyanate groups the listed alcohols, ammonia and/or amines are used in such quantities that at least one reactive hydroxyl and/or amino group is available in the reaction mixture per bonded excess isocyanate group in the polyurethane. For process reasons, however, it has proven to be expedient to use the alcohols, ammonia and/or amines with a relatively large excess. Good results have been obtained if 1 to 100 g, preferably 10–50 g alcohol, ammonia and/or amines are used per gram of polyurethane containing the isocyante groups. In this context it should be mentioned that those alcohols or amines or mixtures of ammonia, alcohols and/or amines should be selected for the saturation of the polyurethanes containing isocyanate groups, in which the polyurethanes are soluble or preferably isoluble to a minor extent, e.g., in quantities by weight of less than 1, preferably less than 0.5% by weight—relative to the weight of the solvent.

In detail, the polyurethane adhesives manufactured according to this invention, are obtained as follows: The polyol, the diisocyanate and—if applicable—the chain extenders, catalysts and other normally used materials are mixed at temperatures of approximately 40° to approximately 100° C., preferably 50° to 80° C. within approximately 3 to approximately 30, preferably 5 to 15 minutes. Subsequently and as long as the material still flows, it is filled into molds and is tempered in customary tempering ovens of 60° C. to approximately 150° C., preferably 90° C. to 130° C. until the polyurethanes have reached the desired molecular weight.

The progress of the polyaddition process is monitored by determining the solution or melting viscosity of samples removed from the product. At the referred temperatures the viscosity, i.e., the molecular weight of the polyurethane rises to the desired value within 2 to 24 hours, preferably 5 to 10 hours. Surprisingly, the viscosity increase is nearly independent of the applied NCO/OH-equivalency ratio. As soon as the polyurethane adhesive has reached the desired molecular weight the product is crushed to a particle size of 1–15 mm, preferably 3 to 10 mm diameter by customary cutting, grinding or granulating equipment. Following this process the material is treated with the above referred alcohols, ammonia, and/or amines and/or mixtures of the referred compounds at temperatures of approximately 10° to approximately 100° C., preferably of 20° C. to 50° C. for approximately 3 to 120, preferably 10 to 60 minutes. For this process the alcohols and/or amines may be used in liquid or gaseous form. The ammonia is applied either in the gas phase or preferably as an alcoholic solution. If liquids are used for this process, the polyurethane particles are suspended in the alcohol, amine and/or the alcoholic ammonia and/or amine solution. After saturation of the isocyanate groups the product is separated from the liquid phase, preferably by filtration or centrifuging, and is subsequently dried. In the other case, the polyurethane particles are preferably placed in an alcohol, ammonia and/or amine atmosphere for 10 to 60 minutes. According to a preferred form of this process the polyurethane particles are transported through the gas on a continuously operating conveyor.

The polyurethane adhesives produced according to the process of this invention have molecular weights of 40,000 to 60,000, the distribution of the molecular weight being very closely limited. The product is soluble in inert organic solvents such as acetone, methyl-ethylketone, tetrahydrofuran, dioxane, butyl acetate, ethyl acetate, or dimethylformamide.

The polyurethane adhesives may be stored and shipped in form of a granulate, and may be dissolved in the above referred solvents. The viscosity of these adhesive solutions can be adjusted to the particular requirements of the gluing process or the materials to be glued by varying the polyurethane content.

In order to obtain particular properties, e.g., to extend the setting time, the adhesiveness and other properties, natural or synthetic resins may be added to the polyurethane adhesives. These include phenolic resins, ketone resins, pine resins, terpene resins, balsam resins, phthalate resins, polyacrylate resins, acetyl or nitrocellulose or other materials such as aluminum oxide, polyethylene powder or silicates as fillers.

The adhesive in solution is applied to the material surfaces to be glued, which may be roughened or pretreated in a different manner. The adhesive may be applied by means of roller, brush, spray gun or other suitable devices. In order to largely evaporate the solvents in the adhesives, and in order to activate the latter, the adhesive coatings are heated to temperatures of approximately 30° C. to 80° C. whereupon two pieces are immediately pressed together. Alternatively, a liquid plastic material, e.g., a plasticizer containing vinyl chloride polymerizate heated to 120° C. to 200° C. is sprayed onto the surface already coated with a dried adhesive layer.

High strength adhesive bonds can be obtained with the polyurethanes manufactured according to this invention. The adhesives are suitable for gluing numerous materials such as paper, cardboard, wood, metal and plastics. These adhesives are preferred for gluing rubber materials, homo- or mixed polymerizates of vinyl chloride containing plasticizers to leather, particularly soles of these materials to the shoe uppers of leather or leather-like synthetic materials.

The invention described above is more fully illustrated by the following specific examples, which are to be interpreted as illustrative only and not in a limiting sense.

EXAMPLE 1

992 g (0.97 mole) of a polyester of adipic acid and butane-diol-1,4 with a hydroxyl number of 118 which was dehydrated in a mixing vessel at 120° C. and 5 mm Hg for one hour are filled up with 174 g (1 mole) of a mixture of 80 parts 2,4- and 20 parts 2,6-toluene diisocyanate at 85° C. while being agitated. During the mixing process the temperature rises to 115° C. After 20 minutes the polyurethane containing the isocyanate groups is poured into sheet metal containers and is tempered in a drying cabinet at 125° C. for 5 hours, is cooled to approximately 25° C. and is granulated to a particle size of approximately 2 to 20 mm diameter by means of a cutting device. The resulting polyurethane, as a 15% by weight solution in methyl-ethyl-ketone has a viscosity of 105 centipoise at 25° C.

The polyurethane granulate was divided into 50 samples. These were either tempered again or were placed into the alcohols, ammonia and/or amines according to this invention at room temperature for 30 minutes. After this period of time they were filtered off, dried and tempered again in order to be able to determine whether or not the reaction had been terminated as desired. The results are summarized in Table 1. The table shows that the reaction was terminated at the desired solution viscosity only by treatment with the alcohols, ammonia, amines and/or mixtures of these components.

Table 1

| Sample No. | Alcohol, Ammonia, Amine Type | Quantity | Tempering Temperature °C. | Time Hours | Viscosity of a 15% by weight solution in methyl-ethyl-ketone (cP) at 25° C. | Comments |
|---|---|---|---|---|---|---|
| 1 | Methanol | 100 g | 125 | 15 | 59 | |
| 2 | Ethanol | 100 g | 125 | 15 | 79 | |
| 3 | Propanol | 100 g | 125 | 15 | 90 | |
| 4 | Glycol | 100 g | 125 | 15 | 120 | |
| 5 | Hexane diol | | 125 | 15 | 173 | |
| 6 | Decane diol | | 125 | 15 | 181 | |
| 7 | Diethanolamine | 100 g | 125 | 15 | 231 | |
| 8 | Ammonia | | 125 | 15 | 194 | |
| 9 | Ethylamine | | 125 | 15 | 185 | |
| 10 | Butylamine | 100 g | 125 | 15 | 219 | |
| 11 | Ethylene diamine | 100 g | 125 | 15 | 218 | |
| 12 | 1% by weight ammonia solution in methanol | | 125 | 15 | 51 | |
| 13 | 1% by weight ammonia solution in ethanol | | 125 | 15 | 226 | |
| 14 | 1% by weight ammonia solution in butanol | | 125 | 15 | 174 | |
| 15 | 1% by weight ammonia solution in ethylene-glycol | | 125 | 15 | 84 | |
| 16 | 1% by weight ammonia solution in | | 125 | 15 | 126 | |

Table 1-continued

| Sample No. | Alcohol, Ammonia, Amine Type | Quantity | Tempering Temperature °C | Time Hours | Viscosity of a 15% by weight solution in methyl-ethyl-ketone (cP) at 25° C. | Comments |
|---|---|---|---|---|---|---|
| 17 | diethylene-glycol 1% by weight methylamine solution in methanol | | 125 | 15 | 80 | |
| 18 | 1% by weight ethanolamine solution in methanol | | 125 | 15 | 112 | |

| Sample No. | Control Group Alcohol, Ammonia, Amine | Solvent Type | Quantity | Tempering ° C. | Hours | Viscosity solution of 15% by weight in methyl-ethyl-ketone (cP) at 25° C. | Comments |
|---|---|---|---|---|---|---|---|
| 1 | — | — | — | 125 | 10 | — | Insoluble in methyl-ethyl-ketone |
| 2 | — | — | — | 25 | 48 | — | " |
| 3 | 1% by weight ammonia solution | Acetone | 100 g | 125 | 15 | — | Product partially soluble |
| 4 | " | Methyl-ethyl-ketone | 100 g | 125 | 15 | — | " |
| 5 | " | Tetra-hydrofuran | 100 g | 125 | 15 | — | " |
| 6 | " | Ethyl acetate | 100 g | 125 | 15 | — | " |
| 7 | " | Methylene chloride | 100 g | 125 | 15 | — | " |
| 8 | " | Hexane | 100 g | 125 | 15 | — | Insoluble |
| 9 | " | Benzene | 100 g | 125 | 15 | — | " |
| 10 | " | H₂O | 100 g | 125 | 15 | — | " |

The following examples show that polyurethanes with the desired viscosities can be produced in a reproducible manner by saturating the excess isocyanate groups with alcohols, ammonia and/or amines, and that the adhesiveness of the product is not impaired by saturating the free isocyanate end groups.

COMPARISON EXAMPLE 840 g (1 mole) of a polyester of adipic acid and hexane diol with a hydroxyl number of 134 which was dehydrated in a round flask—being stirred—at 110° C. and 5 mm Hg for one hour were filled up with 174 g (1 mole) of a mixture of 80% 2,4- and 20% 2,6-toluene diisocyanate at 80° C. During the reaction process the temperature rises to 110° C. After 20 minutes the polyurethane is poured into two sheet metal containers with inside dimensions of 200×200×40 mm and is tempered at 125° C. for 22 hours. The resulting polyurethane, as a 15% by weight solution in methyl-ethyl-ketone has a viscosity of 500 centipoise at 25° C.

EXAMPLE 2

800 g (0.95 mole) of a polyester of adipic acid and hexane diol with a hydroxyl number of 134, which was dehydrated analogous to the data given for the comparison example, is filled up with 174 g (1 mole) of a mixture of 80% 2,4- and 20% 2,6-toluene diisocyanate at 80° C. After 20 minutes the reaction mixture is poured into sheet metal containers, is tempered at 125° C. for 6 hours, cooled, and is crushed to form a granulate with particle sizes of 10 mm diameter. The granulate containing the isocyanate groups is divided in half. One-half is placed in 500 g of a 1% by weight ammonia solution in methanol, the other half is placed in 500 g of a 1% by weight ethanolamine solution in ethylene glycol for 30 minutes at room temperature, after which time the granulate is separated from the solutions and is dried. The solution viscosities of these treated samples (15% by weight solutions in methyl-ethyl-ketone) were 528 and 495 centipoise at 25° C.

We conducted gluing tests with the polyurethanes manufactured according to the Comparison Example and Example 2. The results, summarized in Table 2, show that the products have essentially identical adhesive properties.

Table 2

| | Comparison Example Manufactured of equivalent quantities of diisocyanate and polyesterol | Example 2 Manufactured with a 5% excess of diisocyanate. Reaction terminated with | |
|---|---|---|---|
| Gluing of | | Methanol/ammonia | Ethylene glycol/ ethanolamine |
| Shearing strength (N/cm²) | | | |
| Rubber/rubber | 101 | 88 | 62 |
| PVC/PVC | >229 | >215 | >235 |
| PVC/aluminum | 106 | 116 | 115 |

Table 2-continued

| Gluing of | Comparison Example<br>Manufactured of equivalent quantities of diisocyanate and polyesterol | Example 2<br>Manufactured with a 5% excess of diisocyanate. Reaction terminated with | |
|---|---|---|---|
| | | Methanol/ammonia | Ethylene glycol/ethanolamine |
| PVC/iron Resistance to peeling (N/cm) | 107 | 120 | 110 |
| PVC/PVC | 63 | 51 | 63 |

The embodiments of the invention in which an exclusive property or privilege is claimed are defined as follows:

1. A process for the manufacture of polyurethane adhesives having uniform molecular weights, which comprises the steps of
reacting a stoichiometric excess of organic diisocyanate with a polyol and from 0 to 10% by weight of a chain extender in the presence of a suitable catalyst,
said excess of organic diisocyanate is defined to mean the ratio of isocyanate groups to the active polyol hydrogen atoms and those of any chain extender exceeds 1:1.001,
holding the reaction mixture at a tempering reaction temperature while periodically checking the molecular weight of the reaction product,
cooling and crushing the reaction product at a 40,000 to 60,000 molecular weight into particles, and
treating the crushed particles with an excess of alcohol, ammonia, amine, or mixtures thereof in the absence of organic solvent.

2. A process for the manufacture of polyurethane adhesives as defined in claim 1, in which the ratio of the active polyol hydrogen atoms and those of any chain extender to the isocyanate groups is in the range of 1:1.05 to 1:1.1, and the reaction mixture is held at the tempering temperature from about 2 to 24 hours.

3. A process for the manufacture of polyurethane adhesives having uniform molecular weights, which comprises the steps of
bringing organic diisocyanate and polyol together with a suitable catalyst, additives and from 0 to 10% by weight of chain extenders based on the total polyol and chain extender, with the ratio of the polyol hydrogen atoms and those of any chain extender reactive with the isocyanate groups to the isocyanate groups being in the range of from 1:1.001 to 1:2,
reacting the mixture at a final temperature of the order of 90°–130° C. until a molecular weight of 40,000 to 60,000 is obtained,
cooling and breaking up the reaction product into particles of the order of 1–15 mm, and
treating the particles with an excess of alcohol, ammonia, amine or mixtures thereof in the absence of organic polyurethane solvents.

4. A process for the manufacture of polyurethane adhesives as defined in claim 3, in which the ratio of the polyol hydrogen atoms and those of any chain extender reactive with the isocyanate group to the isocyanate groups is in the range of 1:1.05 and 1:1.1.

5. A process for the manufacture of polyurethane adhesives as defined in claim 3, in which the particles are treated with alcohol, ammonia, amine or mixtures thereof in a ratio of from about 1–100 grams of alcohol, ammonia, amine or mixtures thereof per gram of particulate polyurethane.

6. A process for the manufacture of polyurethane adhesives as defined in claim 4, in which the particles are treated with alcohol, ammonia, amine, or mixtures thereof in a ratio of from about 1–100 grams of alcohol, ammonia, amine, or mixtures thereof per gram of particulate polyurethane.

7. A process for the manufacture of polyurethane adhesives as defined in claim 3, in which the particles are treated with an excess of alcohol, ammonia, amine, or mixtures thereof at a temperature of from 10°–100° C. for a time of from 3 to 120 minutes.

8. A process for the manufacture of polyurethane adhesives as defined in claim 7, in which the particulate polyurethane is treated with ammonia.

9. A process for the manufacture of polyurethane adhesives as defined in claim 5, in which the particles are treated with an alcoholic solution of ammonia, amine or mixtures thereof, with the total amine and ammonia content of the solution being 0.5–10.0% by weight of the solution.

10. A process for the manufacture of polyurethane adhesives as defined in claim 9, in which the alcoholic solution has a total ammonia and amine content of from 1–5% by weight.

* * * * *